(12) United States Patent
Shoebotham

(10) Patent No.: US 8,925,868 B2
(45) Date of Patent: Jan. 6, 2015

(54) CLOSED LOOP CHANNEL FOR PARACHUTE

(76) Inventor: Todd Edward Shoebotham, Temecula, CA (US)

( * ) Notice: Subject to any disclaimer, the term of this patent is extended or adjusted under 35 U.S.C. 154(b) by 52 days.

(21) Appl. No.: 12/653,589

(22) Filed: Dec. 16, 2009

(65) Prior Publication Data

US 2011/0139935 A1   Jun. 16, 2011

(51) Int. Cl.
  *B64D 17/02*  (2006.01)
  *B64D 17/40*  (2006.01)

(52) U.S. Cl.
  CPC ............... *B64D 17/02* (2013.01); *B64D 17/40* (2013.01)

USPC .......................................... 244/145

(58) Field of Classification Search
  USPC .................. 244/145, 147, 149, 152
  See application file for complete search history.

(56) References Cited

U.S. PATENT DOCUMENTS

| 4,399,969 | A | * | 8/1983 | Gargano | 244/145 |
| 4,664,342 | A | * | 5/1987 | Jones | 244/147 |
| 4,948,071 | A | * | 8/1990 | Summers, III | 244/149 |
| 5,213,288 | A | * | 5/1993 | Girdwood | 244/145 |

* cited by examiner

*Primary Examiner* — Valentina Xavier

(57) ABSTRACT

A parachute comprising a channel extending from the bottom surface of the parachute to the top surface of the parachute, and configured to allow for the passage of a closing loop mounted to a parachute container.

4 Claims, 7 Drawing Sheets

CLOSED LOOP CHANNEL FOR PARACHUTE

BACKGROUND OF THE INVENTION

1. Field of the Invention

The invention relates generally to the field of parachutes. In particular, the invention relates to a closed loop channel for use on a ram-air type parachute.

2. Description of Related Art

Modern ram-air parachutes and parachute container systems are designed to support specialized applications. Military systems, sport skydiver systems for use in making jumps from an airplane, and rapid deployment parachute systems such as those used for BASE jumping all have specific performance requirements.

Parachutes are typically packed in a device referred to as a container. The container consists of a pack tray and a number of container flaps that are folded over the parachute so that grommets on each container flap are aligned. A closing loop is threaded through the grommets on the container flaps. A curved pin is then placed through the closing loop to prevent the container flaps from opening. The curved pin is attached to a bridle that in turn is attached to a pilot chute. When the pilot chute is deployed the force on the pilot chute pulls the bridle, which in turn pulls the curved pin out of the closing loop, releasing the container flaps and allowing the main parachute to deploy.

It is well known in the prior art to mount the closing loop to the pack tray. Such prior art pack tray mounted closing loop systems, however, do not work well in certain applications where it is critical that the parachute deploy extremely quickly, such as in BASE jumping. BASE jumping is parachuting from fixed objects. BASE is an acronym for Building, Antenna, Span, Earth, but there are other objects or "exit points" that do not fit into the four objects. Because there is very little time to deploy the parachute in most BASE jumps, rapid, reliable deployment is critical.

Rapid deployment systems require minimal compression of the parachute. Prior art pack tray mounted closing loop systems require additional folding and compression of the parachute to allow for the closing pin to pass around the parachute. To avoid this problem, in some prior art rapid deployment systems the parachute container uses one or more closing loops that are not attached to the pack tray.

SUMMARY OF THE INVENTION

A parachute is provided comprising a top surface and a bottom surface, and a channel extending between said top surface and said bottom surface that is configured to allow for the passage of a closing loop mounted to a container pack tray through the channel.

DETAILED DESCRIPTION OF THE PREFERRED EMBODIMENTS

The following description is presented to enable any person skilled in the art to make and use the invention. For purposes of explanation, specific nomenclature is set forth to provide a thorough understanding of the present invention. Descriptions of specific embodiments or applications are provided only as examples. Various modifications to the embodiments will be readily apparent to those skilled in the art, and general principles defined herein may be applied to other embodiments and applications without departing from the spirit and scope of the invention. Thus, the present invention is not intended to be limited to the embodiments shown, but is to be accorded the widest possible scope consistent with the principles and features disclosed herein.

Figure 1:
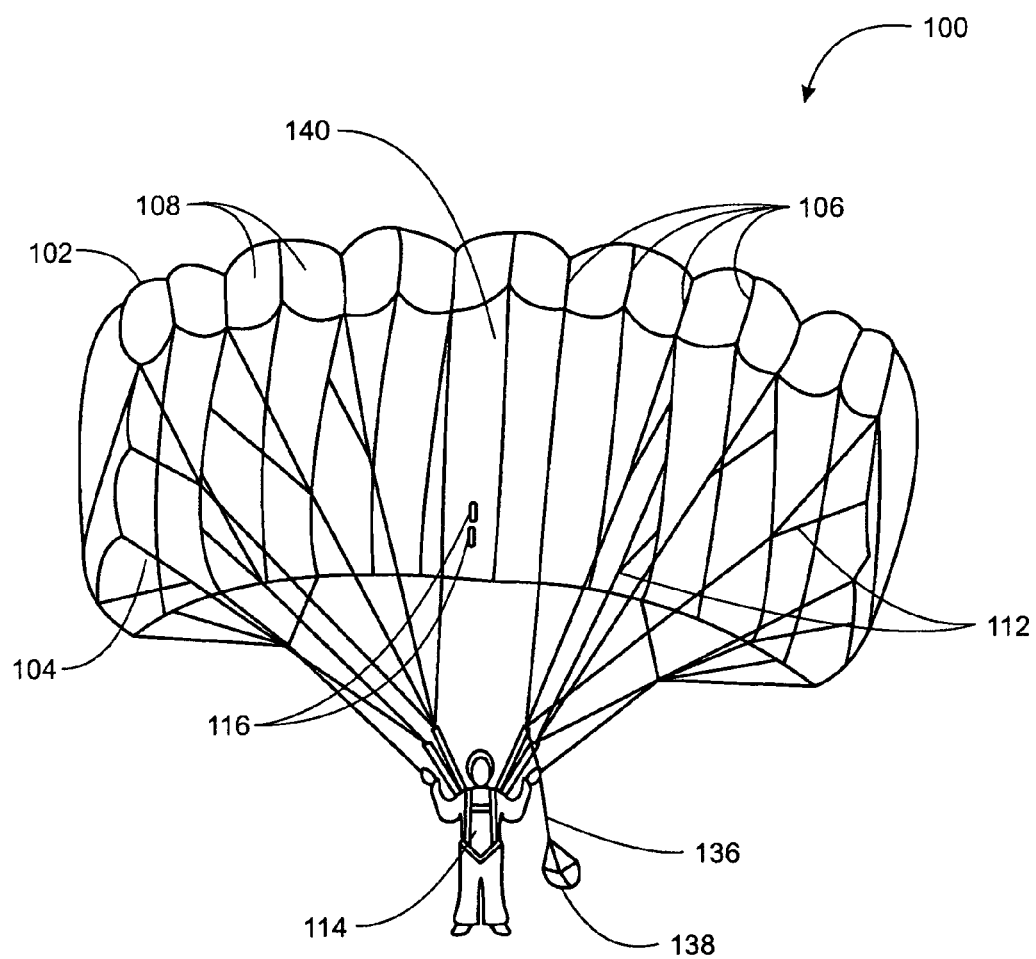
FIG. 1 is a front bottom perspective view diagram showing an exemplary embodiment of the inventive ram-air parachute fully deployed.
Figure 2:
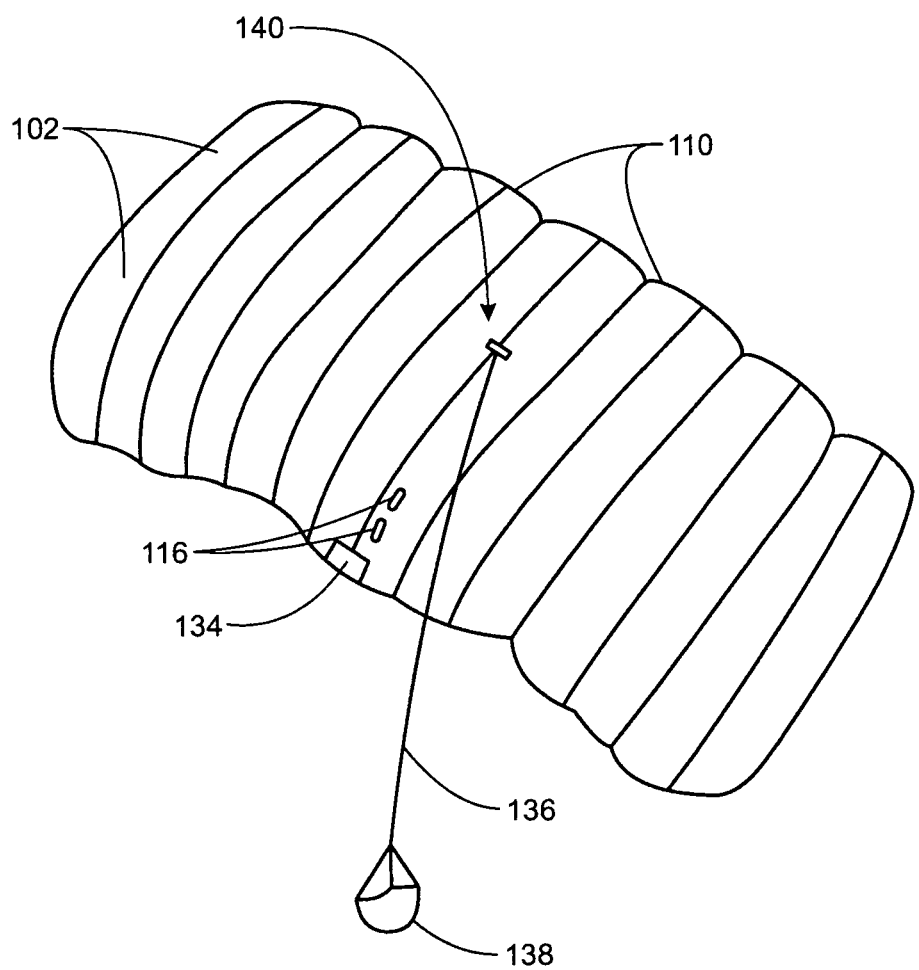
FIG. 2 is a rear top perspective view diagram showing an exemplary embodiment of the inventive ram-air parachute as deployed.

Referring to FIGS. 1 & 2, a ram-air parachute 100 is square or rectangular in shape and is made of lightweight nylon. The parachute consists of a top surface 102 and bottom surface 104, each made of a durable, relatively wind resistant fabric such as nylon. Ribs 106, typically made of the same fabric, extend between the top and bottom surfaces. The ribs divide the parachute into a set of individual cells 108, and the complete structure forms the parachute canopy. Some of the ribs may be load bearing, while other ribs may not be load bearing. Air enters the cells of the canopy from the front to inflate the cells so that the top and bottom surfaces act as airfoil surfaces. This makes the parachute act like a wing so that it glides forward as it descends.

A ram-air parachute relies on internal pressure to keep the wing inflated, thus providing the airfoil needed to create lift. The internal pressure is provided by having an open leading edge or nose, and presenting a nose-down angle of attack during flight. This angle of attack, combined with the jumpers suspended weight, moves the parachute forward to provide the ram-air effect keeps the wing inflated.

A ram-air parachute will typically have several cells 108, and each cell may be divided into two half cells. These cells extend from the front to the back of the parachute in a "chord" direction. The cells are sewn next to one another to expand the air foil left and right in the "span" direction as it is deployed. It is critical to the function of the canopy that air passes from the front to the back of the parachute through the individual cells with minimal leakage through the top, bottom, and external surfaces. Such leakage of the internal air from the canopy cells would reduce the stiffness of the airfoil, potentially causing a distortion in the airfoil and changing the flight characteristics of the parachute.

In rapid deployment systems, the parachute must fully deploy quickly and dependably as the typical jump time is very short and there may not be an opportunity to deploy a reserve parachute if the main parachute fails. The skydiving industry has used pack tray mounted closing loops for decades because they are reliable and easy to use. However, container systems that use closing loop(s) affixed to the pack tray have always required the packer to fold the parachute in a manner that allows the closing loops to pass around the parachute. This arrangement works well for sport skydiving, but does not work effectively with rapid deployment systems such as BASE equipment because it requires extra folds in the parachute that compromise the consistency and reliability of the parachute.

The present invention overcomes this problem through the introduction of channels through the parachute that allow passage of the closing loop or loops through the parachute itself. Referring to FIGS. 1 & 2, an exemplary embodiment of the invention consists of ram-air parachute 100 having a top surface 102 and a bottom surface 104 separated by chordwise-extending ribs 106 to form cells 108 inflated by inflow of air at an open leading edge 110. Suspension lines 112 connect the bottom surface of the parachute to a load 114. One or more channels 116 of fabric are sewn into the canopy between the top surface and the bottom surface such that a closing loop or loops can pass through the parachute via a channel.

Figure 3:
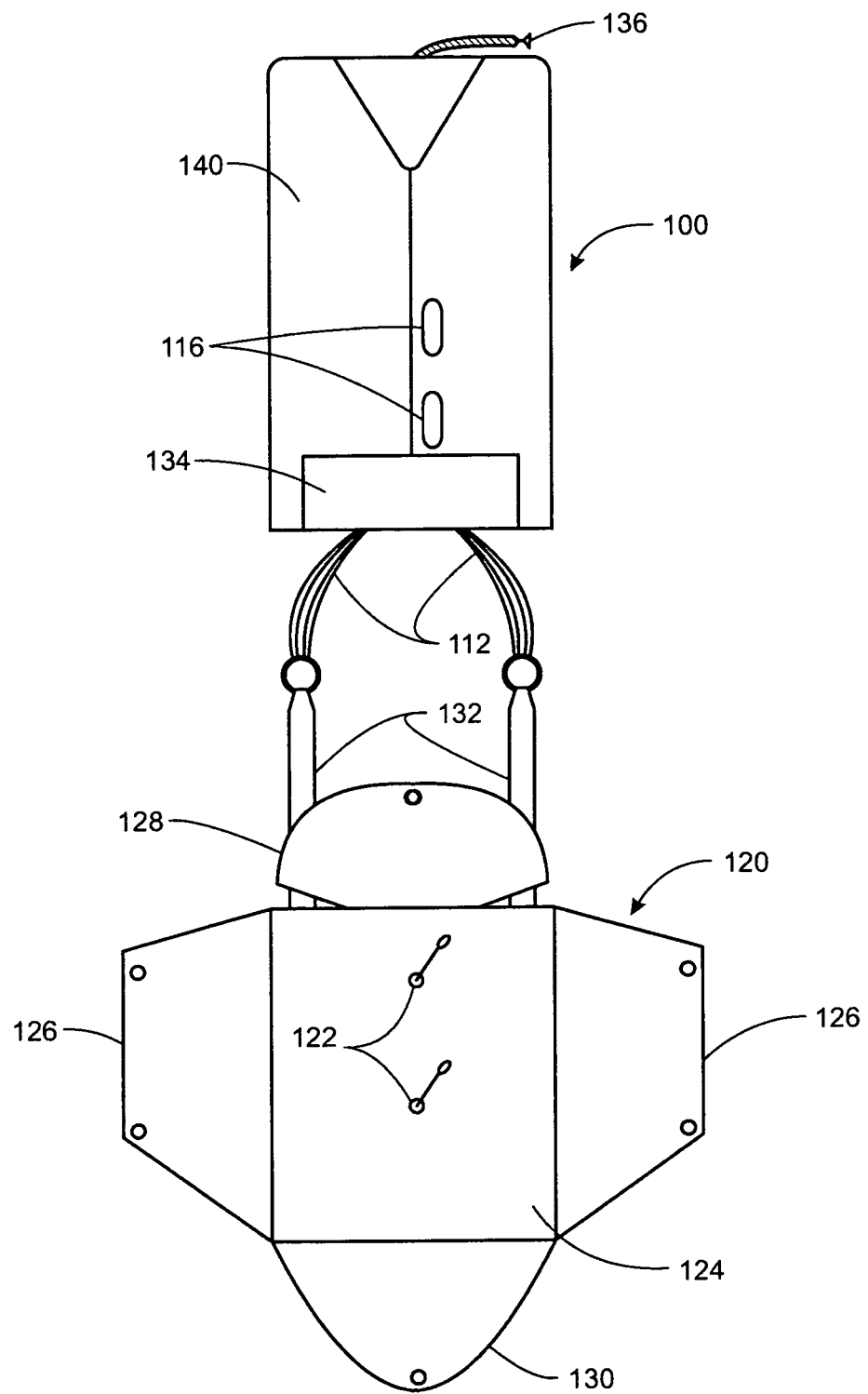
FIG. 3 is a plan view diagram showing a container system and an exemplary embodiment of the inventive ram-air parachute folded for packing.

Referring to FIG. 3, an exemplary container system 120 with two pack tray mounted closing loops 122 is shown. The container pack tray 124 has two side closing flaps 126, a top closing flap 128 and a bottom closing flap 130. The parachute 100 is connected to the container system via risers 132 and the suspension lines 112. The bulk of the suspension lines 112 are carefully stowed in the tail pocket 134 for packing. The bridle 136 is attached a pilot chute 138. When a parachute using the disclosed invention is folded for packing, the channel cell 140 that contains the channels 116 is positioned in the center such that the channels 116 will be aligned with the closing loops 122.

Figure 4:
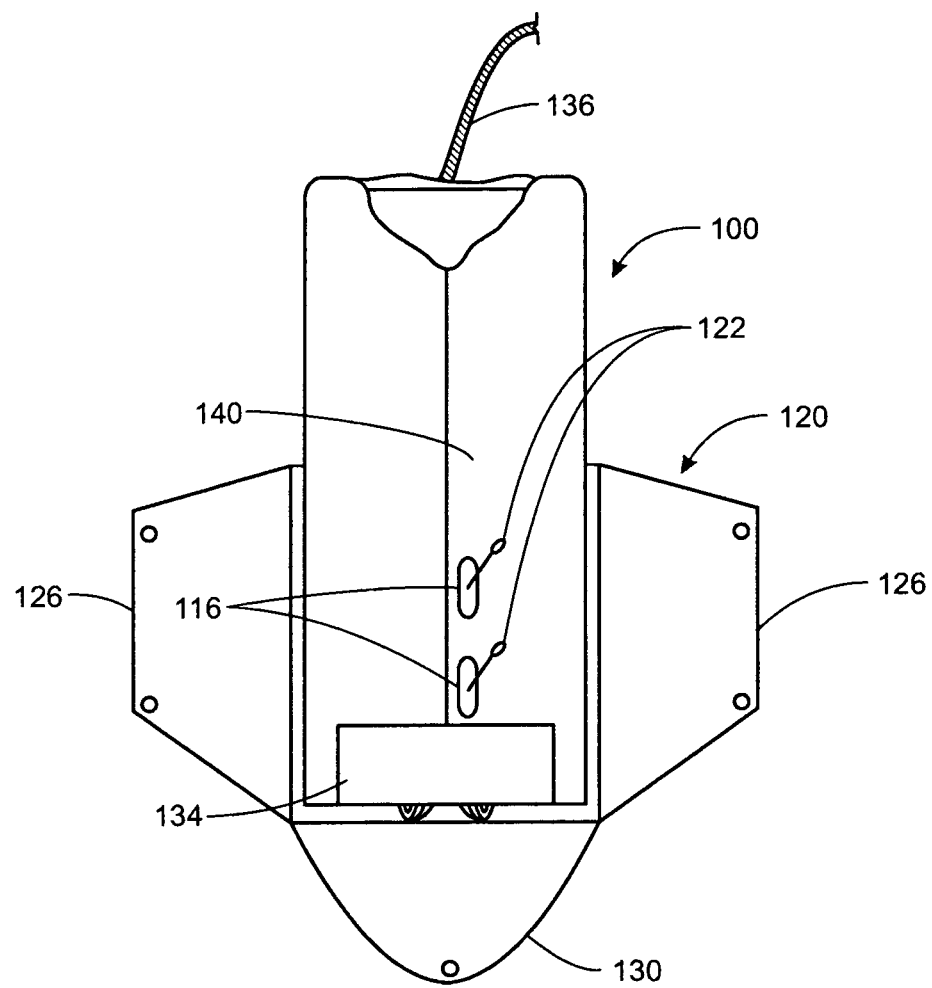
FIG. 4 is a plan view diagram showing a container system and an exemplary embodiment of the inventive ram-air parachute partially folded for packing and placed on the packing tray.
Figure 5:
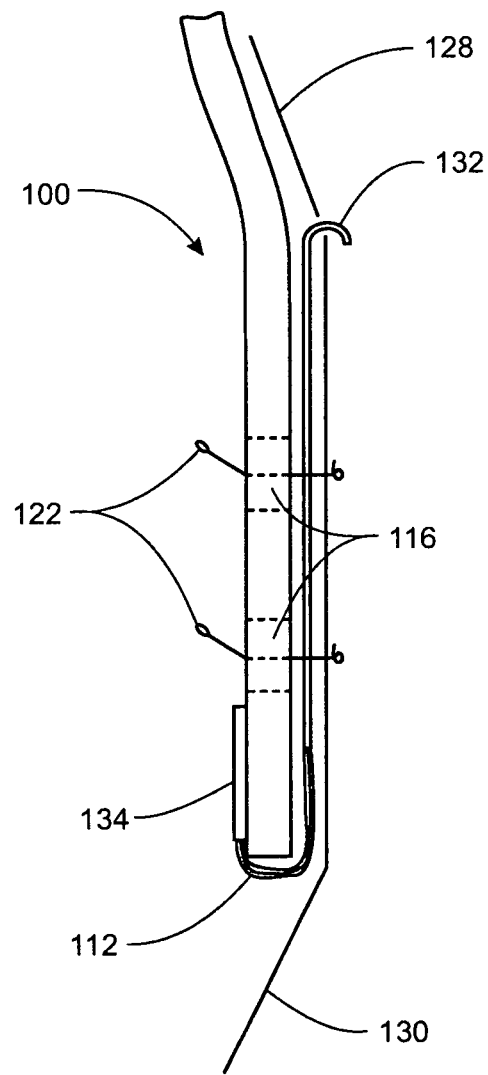
FIG. 5 is a side view diagram showing a container system and an exemplary embodiment of the inventive ram-air parachute partially folded for packing and placed on the packing tray.

Referring to FIGS. 4 & 5, an exemplary embodiment of the invention is shown with the parachute 100 partially folded and placed onto the container pack tray 124. The closing loops 122 are passed through the channels 116, allowing the parachute to be compressed more completely without additional folding. The channels 116 may typically be constructed of the same material as the parachute, and each channel creates a passage through the canopy that is sufficiently airtight to avoid significant leakage into or out of the channel cell 140. Because the channels 116 are effectively sealed internally, they do not allow air to escape the airfoil during the flight.

Figure 6:
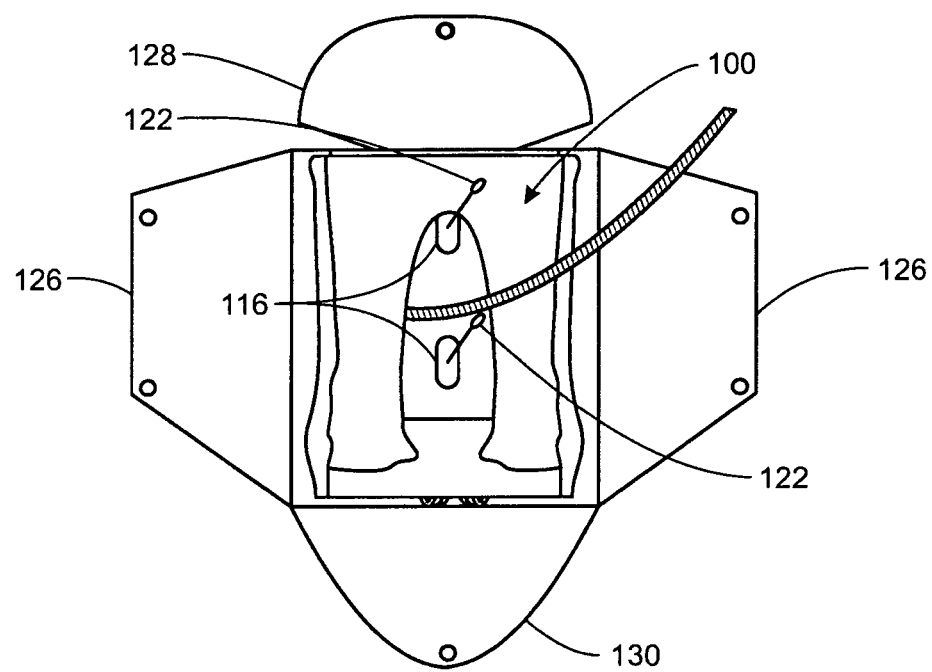
FIG. 6 is a plan view diagram showing a container system and an exemplary embodiment of the inventive ram-air parachute folded for packing and placed on the packing tray.
Figure 7:
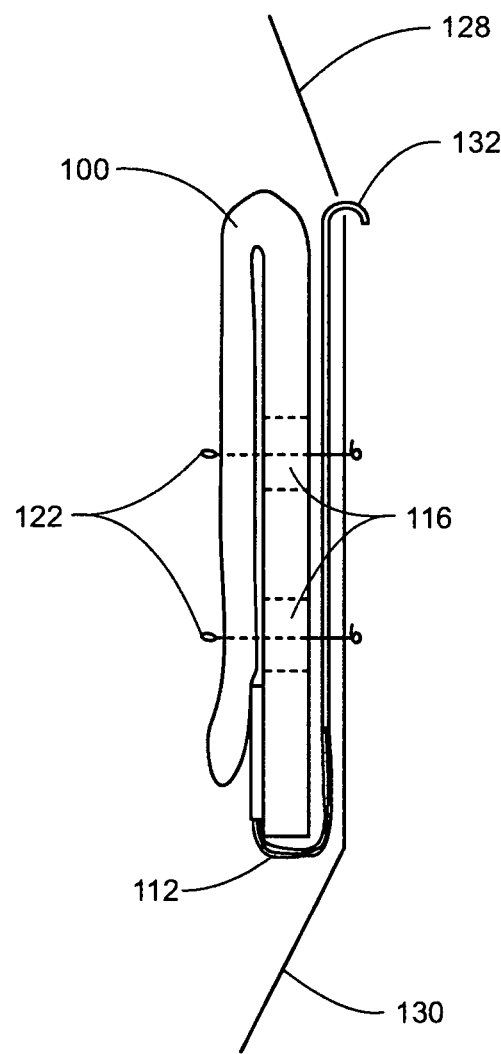
FIG. 7 is a side view diagram showing a container system and an exemplary embodiment of the inventive ram-air parachute folded for packing and placed on the packing tray.

Referring to FIGS. 6 & 7, an exemplary embodiment of the invention is shown with the parachute 100 completely folded and placed onto the container pack tray 124. The closing loops 122 are passed through the channels 116 and the remainder of the parachute 100 is folded such that it does not obstruct the closing loops 122 in any way. The side closing flaps 126, top closing flap 128, and bottom closing flap 130, can all then be closed over the parachute 100 and fastened into position by placing standard curved pins through the closing loops 122.

As shown in the exemplarly embodiment illustrated in FIGS. 1-7, the channels 116 may be positioned near the trailing edge of the parachute near the center of the span. This position allows for easy alignment of the channels during folding of a typical parachute 100. Depending on the configuration of the container system 120 and number of closing loops 122, there may be one or more channels to allow passage of one or more closing loops. Moreover, it will be readily understood by those of skill in the art that the channel or channels may be located in any part of the parachute 100, depending on the particular configuration of the container system 120 and parachute 100 and the packing method used.

While the present invention is particularly well suited to use on ram-air type parachutes, the invention is not so limited and can be used on any type of parachute that is designed to be packed in a container with a pack tray mounted closing loop or loops.

What is claimed is:

1. A parachute comprising:
    a top surface and a bottom surface;
    fabric ribs interposed between the top surface and the bottom surface and extending generally between an open leading edge of the parachute and a trailing edge of the parachute, the ribs forming cells between the top surface and bottom surface when inflated by inflow of air at the open leading edge of the parachute;
    an enclosed channel extending between and through said top surface and said bottom surface through one of the cells;
    said enclosed channel configured to allow for the passage of a closing loop mounted to a container pack tray through the parachute, such that the closing loop can slide within the enclosed channel.

2. The apparatus of claim 1, wherein the enclosed channel is made of fabric.

3. The apparatus of claim 1, wherein the parachute is a ram-air parachute.

4. The apparatus of claim 1, wherein the enclosed channel is substantially airtight.

* * * * *